(12) United States Patent
Kim et al.

(10) Patent No.: US 8,593,401 B1
(45) Date of Patent: Nov. 26, 2013

(54) MOBILE TERMINAL INCLUDING A DOUBLE-SIDED DISPLAY UNIT AND CONTROLLING METHOD THEREOF

(71) Applicant: LG Electronics Inc., Seoul (KR)

(72) Inventors: Yongsin Kim, Seoul (KR); Doyoung Lee, Seoul (KR); Hyorim Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/850,965

(22) Filed: Mar. 26, 2013

(30) Foreign Application Priority Data

Feb. 27, 2013 (KR) ........................ 10-2013-0021381

(51) Int. Cl.
*G09G 5/00* (2006.01)
(52) U.S. Cl.
USPC ............. 345/156; 345/1.1; 345/169; 345/173
(58) Field of Classification Search
USPC .............. 345/156, 169, 173, 1.1–1.3, 2.1–2.3
See application file for complete search history.

(56) References Cited

U.S. PATENT DOCUMENTS

| | | | |
|---|---|---|---|
| 7,366,547 B2* | 4/2008 | Hasegawa et al. ............ | 455/566 |
| 7,864,134 B2* | 1/2011 | Kim et al. ...................... | 345/1.1 |
| 7,908,555 B2 | 3/2011 | Zellner | |
| 7,973,738 B2 | 7/2011 | Teng et al. | |
| 8,204,270 B2* | 6/2012 | Tanigawa et al. ............. | 382/100 |
| 2009/0259958 A1* | 10/2009 | Ban ............................... | 715/765 |
| 2010/0048253 A1 | 2/2010 | Park et al. | |
| 2010/0184485 A1 | 7/2010 | Kim | |
| 2010/0194705 A1* | 8/2010 | Kim et al. ..................... | 345/173 |
| 2011/0039603 A1 | 2/2011 | Kim et al. | |
| 2011/0087955 A1 | 4/2011 | Ho et al. | |
| 2011/0124376 A1 | 5/2011 | Kim et al. | |
| 2011/0225366 A1 | 9/2011 | Izadi et al. | |
| 2011/0260948 A1 | 10/2011 | Teng et al. | |
| 2012/0092280 A1* | 4/2012 | Miura et al. .................. | 345/173 |
| 2012/0274551 A1* | 11/2012 | Ishizuka et al. ............... | 345/156 |

* cited by examiner

*Primary Examiner* — Duc Dinh
(74) *Attorney, Agent, or Firm* — Birch, Stewart, Kolasch, LLP

(57) ABSTRACT

A mobile terminal including a first display unit and a second display unit using an e-paper display panel, and a sensor unit configured to detect an input signal and transmit the detected input signal to a processor. The processor is further configured to detect a trigger signal to switch the mobile terminal to a standby state, display a standby state preview interface in the first display unit displaying a content currently displayed in the second display unit, and if an input signal for the standby state preview interface is not detected within a predetermined time, switch the mobile terminal to the standby state without changing the content displayed in the second display unit.

16 Claims, 13 Drawing Sheets

FIG. 3
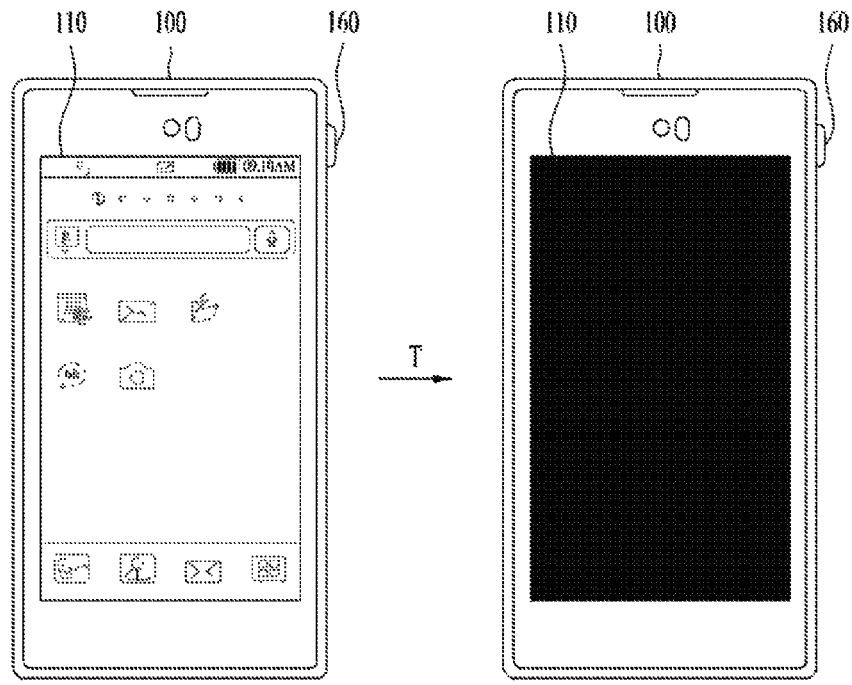
(a)
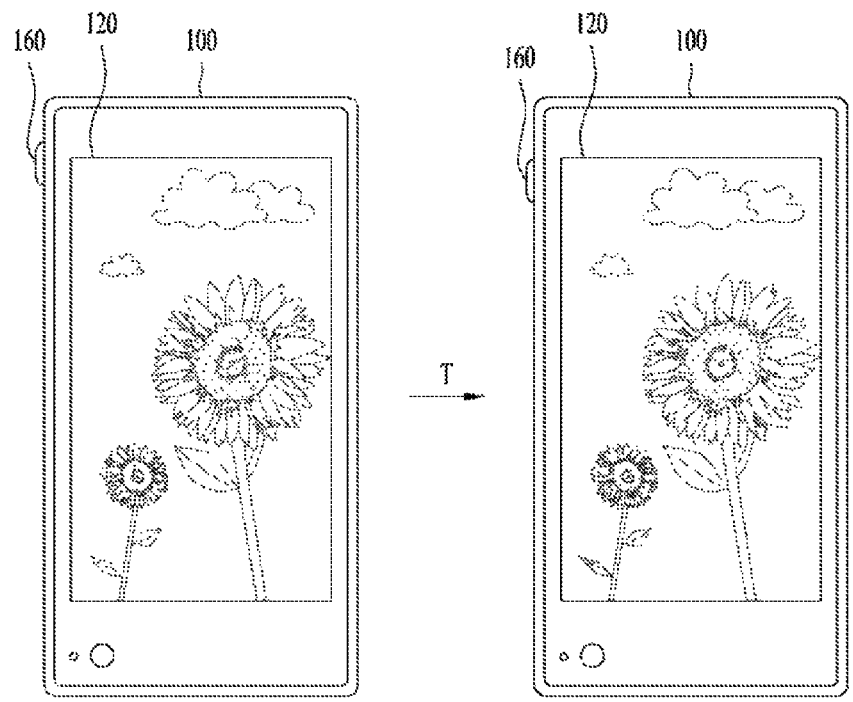
(b)

FIG. 4
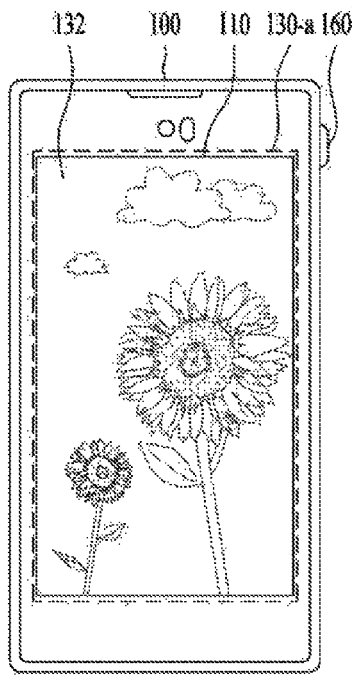
(a)
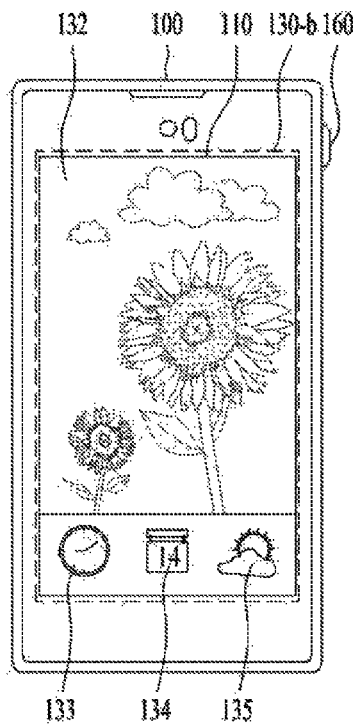
(b)
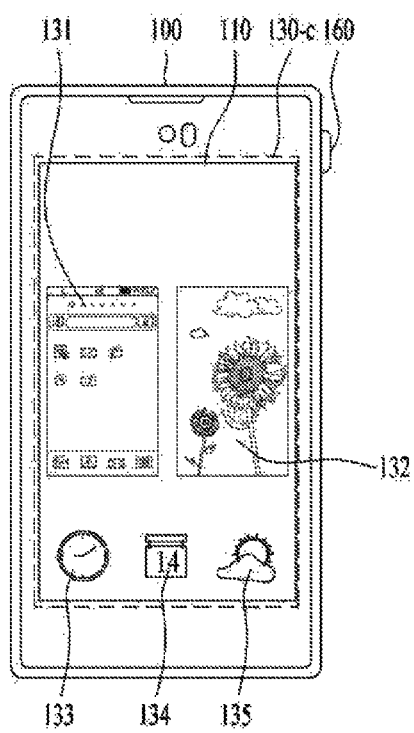
(c)
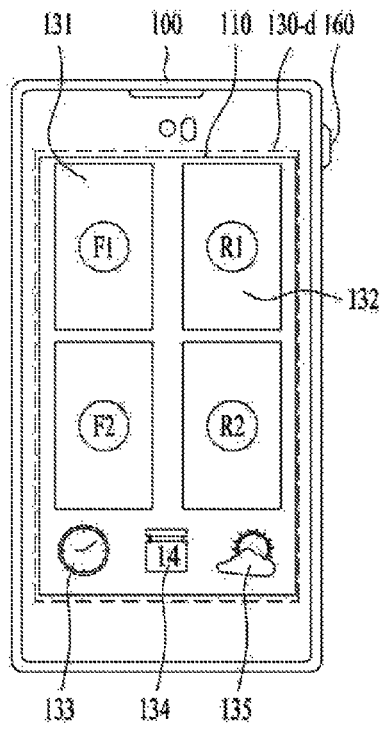
(d)

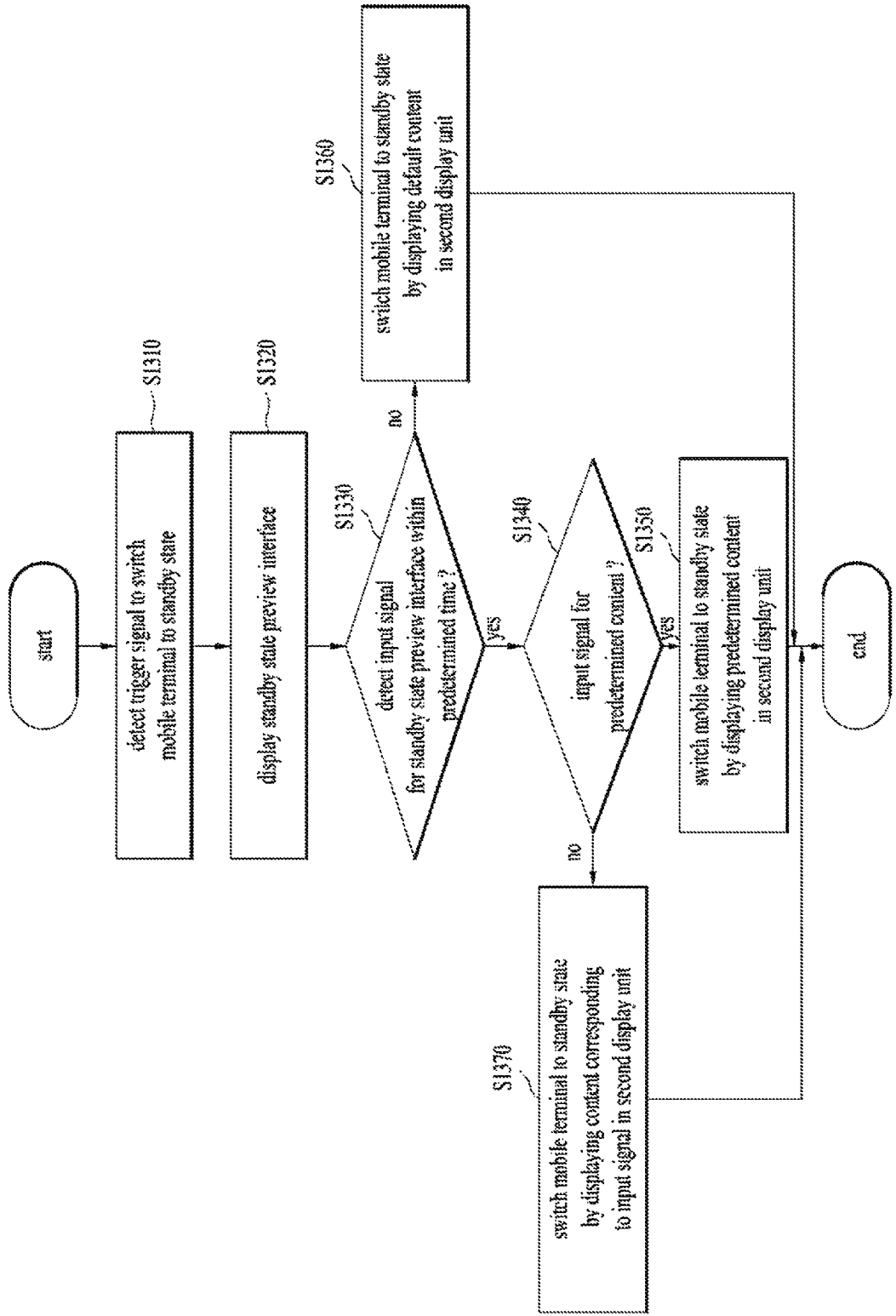

US 8,593,401 B1

MOBILE TERMINAL INCLUDING A DOUBLE-SIDED DISPLAY UNIT AND CONTROLLING METHOD THEREOF

Pursuant to 35 U.S.C. §119(a), this application claims the benefit of the Korean Patent Application No. 10-2013-0021381, filed on Feb. 27, 2013, which is hereby incorporated by reference as if fully set forth herein.

BACKGROUND OF THE INVENTION

1. Field of the Invention

The present specification relates to a mobile terminal including a double-sided display unit and a controlling method thereof, and more particularly, to a method of controlling a content to be displayed in a second display unit in a first display unit of the mobile terminal in a standby state.

2. Discussion of the Related Art

A mobile terminal is a portable device equipped with such a function as an audio/video call function, content display function, and the like. As the function of the mobile terminal is diversified, the mobile terminal has equipped with complex functions such as taking a picture/video, playing music/video, game, receiving a broadcast and the like. And, new various attempts to implement a complex function in the mobile terminal are applied in terms of hardware or software.

Meanwhile, a mobile terminal uses LCD, LED, and the like as a display unit. Recently, the mobile terminal using an e-paper as a display means has appeared. Since the e-paper uses an e-ink instead of a liquid crystal, unlike a different display lit from the back of a screen, the e-paper is able to see an image only with an exterior lighting, thereby reducing a power loss. And, if a power of a LCD is turned off, a displayed screen is disappeared immediately, whereas a screen of the e-paper is maintained as it is even though the power of the e-paper is turned off.

SUMMARY OF THE INVENTION

According to one embodiment, one object of the present specification is to preview an image to be displayed in a second display unit in a first display unit without switching a front and rear side of a mobile terminal in a standby state.

Another object of the present specification is to continuously maintain a content that a user wants in a standby state of a mobile terminal via a second display unit using an e-paper display panel.

Another object of the present specification is to continuously maintain a content that a user wants in a standby state of a mobile terminal via a second display unit using an e-paper display panel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present specification, as embodied and broadly described, according to one embodiment a mobile terminal containing a double-sided display unit includes a first display unit and a second display unit, wherein the second display unit uses an e-paper display panel, a sensor unit configured to detect an input signal and transmit the detected input signal to a processor, and a processor configured to control the first display unit, the second display unit, and the sensor unit, wherein the processor is further configured to: detect a trigger signal to switch the mobile terminal to a standby state, display a standby state preview interface in the first display unit displaying a content currently displayed in the second display unit, if an input signal for the standby state preview interface is not detected within a predetermined time, switch the mobile terminal to the standby state without changing the content displayed in the second display unit.

To further achieve these and other advantages and in accordance with the purpose of the present specification, according to one embodiment a method of controlling a mobile terminal containing a first display unit and a second display unit, wherein the second display unit uses an e-paper display panel include the steps of detecting a trigger signal to switch the mobile terminal to a standby state, displaying a standby state preview interface in the first display unit displaying a content currently displayed in the second display unit based on the detected trigger signal, and if an input signal for the standby state preview interface is not detected within a predetermined time, switching the mobile terminal to the standby state without changing the content displayed in the second display unit.

Accordingly, the present invention provides the following effects and/or advantages.

According to one embodiment, a user may be able to check a content to be displayed in an e-paper display situated at the back of a mobile terminal in a standby state, immediately before the mobile terminal switches from an active state to the standby state.

According to one embodiment, a user may be able to easily check a content to be displayed in a second display unit in a standby state of a mobile terminal in advance without rotating or moving the mobile terminal.

According to one embodiment, a user may be able to consistently display a needed content in a manner of using an e-paper display in a standby state of a mobile terminal.

According to one embodiment, a user may be able to select a content to be displayed in a second display unit in a standby state via various contents displayed in a standby state preview interface.

According to one embodiment, if a private content requiring a security is displayed in a second display unit, a user may be able to display default content in the second display unit in a standby state without a separate user.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram for indicating a first and a second display unit in accordance with a state of a mobile terminal;

FIG. 4 is a diagram for indicating an embodiment of a standby state preview interface;

FIG. 13 is a flowchart for indicating a method of controlling a mobile terminal including a double-sided display unit.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present specification. Wherever possible, the same reference numbers will be used throughout the drawings to refer to the same or similar parts.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been concretely described with reference to the attached diagrams and the contents written on the diagrams, the present specification may be non-restricted or non-limited to the embodiments.

Figure 1:
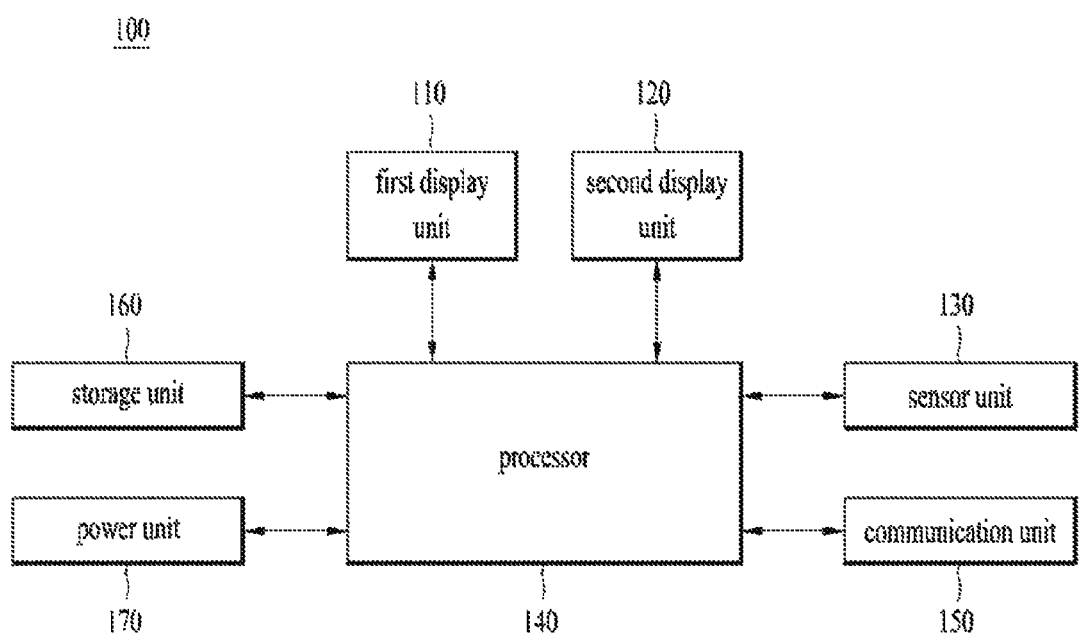
FIG. 1 indicates a block diagram of a mobile terminal including a double-sided display unit.

FIG. 1 indicates a block diagram of a mobile terminal including a double-sided display unit. Referring to FIG. 1, a mobile terminal including a double-sided display unit 100 (hereinafter abbreviated a mobile terminal) may include a first display unit 110, a second display unit 120, a sensor unit 130, a processor 140, a communication unit 150, a storage unit 160 and a power unit 170.

First of all, the mobile terminal 100 indicate an easy-to-carry digital device and may include a cellular phone, a smart phone, a notebook computer, a terminal device for digital broadcast, a PDA (personal digital assistants), a PMP (portable multimedia player), and the like.

The first and second display unit 110/120 may be able to display the information processed in the mobile terminal 100. For instance, the first and the second display unit 110/120 may be able to display an UI (user interface) or a GUI (graphic user interface) related to the information processed by the processor 130.

The first display unit 110 may include a liquid crystal display, a thin film transistor-liquid crystal display (TFT LCD), an organic light-emitting diode (OLED), a flexible display, a 3D display, and the like. As one embodiment, the first display unit 110 can be situated at the front or back of the mobile terminal 100. And, the first display unit 110 may correspond to a display, which mainly implements content or an application by a user, as a main display of the mobile terminal 100. In the present specification, the first display unit 110 may display content in an active state of the mobile terminal 100 in a manner that a power is on. Yet, the first display unit 110 may not display the content in a standby state in a manner that the power is off.

Next, the second display unit 120 may include an e-paper display panel. The e-paper is a display method using an e-ink and may include a plurality of spherical capsules and a transistor situated at the top and bottom of the spherical capsule. In this case, the spherical capsule may change colors in a manner of changing an electrical shock between transparent electrode plates and may display a letter or an image. And, the second display unit 120 can be situated at one or more places among the opposite side of the first display unit 110, an upper part, a bottom part, a left side, a right side.

In one embodiment, the second display unit 120 can be situated at the opposite side of the first display unit 110. And, the second display unit 120 may correspond to a sub display of the mobile terminal 100. For instance, a user may use the second display unit 120 as a supplement while using the first display unit 110. And, for instance, if a battery of the mobile terminal 100 is not sufficient, the second display unit 120 may use the content used in the first display unit 110 in a manner of moving to save the battery. And, for instance, the second display unit 120 can be used in case that the content displayed in the first display unit is not clear in the open air.

Meanwhile, according to the present specification, the first and the second display unit 110/120 may be equipped with a touch sensor and may be equipped in a form of a touch screen. In case that the first and the second display unit 110/120 are equipped in a form of the touch screen, the first and the second display unit 110/120 can be used as an input device as well as an output device. Regarding the touch sensor, it shall be described in a sensor unit 130 part.

Next, the sensor unit 130 detects a user input using at least one sensor installed in the mobile terminal 100 and may deliver an input signal to a processor 140 according to a detected result. In this case, the sensor unit 130 may include a plurality of sensing means. As one embodiment, a plurality of the sensing means may include such a sensing means as a gravity sensor, a terrestrial magnetism sensor, a motion sensor, a gyro sensor, an acceleration sensor, an infrared sensor, a inclination sensor, a brightness sensor, an altitude sensor, a smell sensor, a temperature sensor, a depth sensor, a pressure sensor, a bending sensor, an audio sensor, a video sensor, a GPS (global positioning system) sensor, a grip sensor, a touch sensor, a proximity sensor, and the like. The sensor unit may be a common name for the various aforementioned sensing means. And, the sensor unit 130 senses various inputs of a user and the environment of the mobile terminal and may be then able to deliver the sensed result to the processor 140 in order for the processor to perform an operation according to the sensed result. The aforementioned sensors may be included in the mobile terminal as a separate element or may be included in the mobile terminal in a manner of being combined with at least one element.

According to the present specification, the sensor unit 130 may detect a trigger signal to switch the mobile terminal 100 to a standby state. In this case, the trigger signal may include a signal automatically occurring in case that an user input for the mobile terminal 100 does not exist and a standby state switching signal by the user input. And, the sensor unit 130 may detect an input signal for a standby state preview interface. In this case, the input signal for the standby state preview interface may include a touch input for the first display unit 110. For instance, the touch input may include a proximity touch and a contact touch. The proximity touch indicates that a hand of a user or an object is closely positioned at the display unit 110/120 in a manner of not touching the display unit. And, the input signal for the standby state preview interface may include a touch input for a side button 160 of the mobile terminal 100. In this case, the side button 160 is a physical key situated at the side of the mobile terminal 100 and may correspond to a button recognizing an input by a physical power.

Next, the processor 140 may execute contents received via a data communication or the contents stored in the storage unit 160, or the like. And, the processor 140 may be able to execute various applications and process data of the internal of the mobile terminal 100. And, the processor 140 controls each unit of the mobile terminal 100 and may be able to control data transmission and reception between the units.

According to the present specification, the processor 140 detects a trigger signal to switch the mobile terminal 100 to a standby state and may be then able to display a standby state preview interface in the first display unit 110 based on the detected trigger signal. In this case, the standby state preview interface enables the content or an image to be displayed in the second display unit 120 of the mobile terminal 100 in the standby state to be set. For instance, the standby state preview interface may display the content currently displayed in the second display unit 120. And, if an input signal for the standby state preview interface is not detected within a preset time, the processor 140 may be switched the mobile terminal 100 to the standby state without changing the content displayed in the second display unit 120.

Next, the communication unit 150 may perform a communication with an external device using a various protocols and transceive data with the external device using the various protocols. The communication unit 150 accesses a network by wired or wireless and may be then able to transceive a digital data with the network. According to the present specification, the mobile terminal 100 may tranceive data with the external device or a server using the communication unit 150. And, according to the present specification, the communication unit 150 can be selectively equipped with the mobile terminal 100.

The storage unit 160 may store such a various digital data as a video, an audio, a picture, an application, and the like. The storage unit 160 may store a program for processing and controlling of the processor 140 and may perform a function of temporary storing the input/output data. The storage unit 160 may include such a various digital storage space as a flash memory, a RAM (random access memory), a SSD (solid state drive), and the like.

The power unit 170 45 is a power source connected to a battery of the internal of the mobile terminal 100 or an external power supply. It is able to supply a power to the mobile terminal 100.

The mobile terminal 100 depicted in FIG. 1 is a block diagram according to one embodiment. Blocks represented in a manner of being separated indicate the logically distinguished elements of the mobile terminal 100. Hence, the elements of the aforementioned mobile terminal 100 may be equipped with a single chip or a plurality of chips according to the design of the device.

Figure 2:
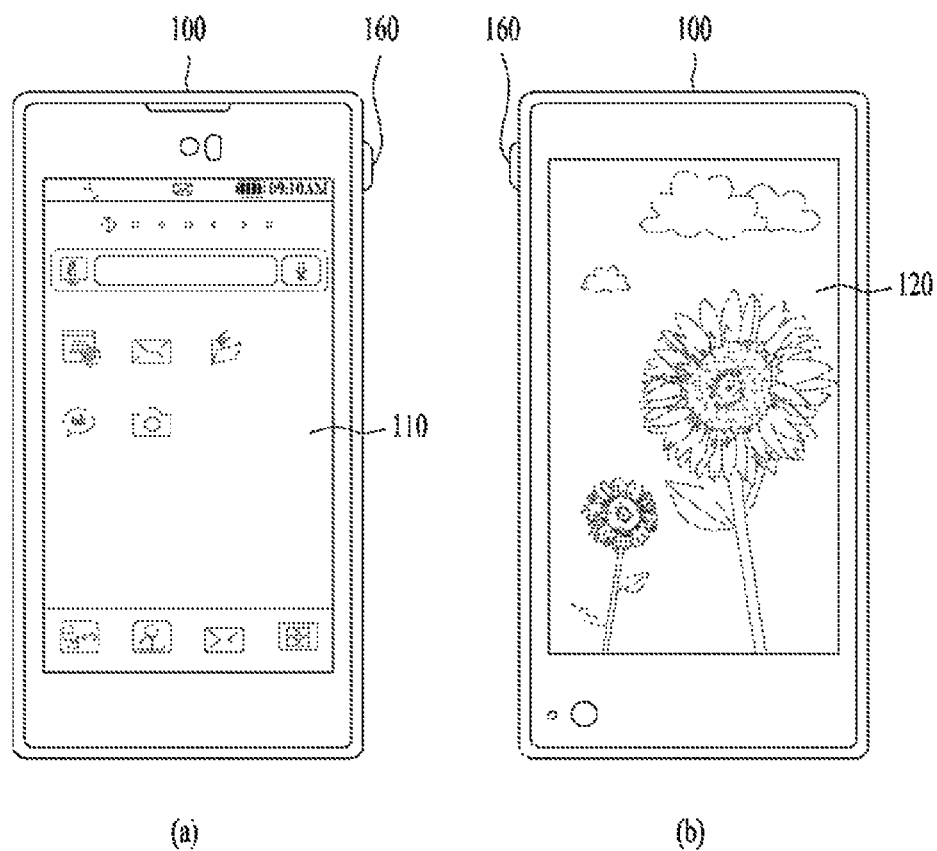
FIG. 2 is a diagram for indicating a first and a second display unit of a mobile terminal.

FIG. 2 is a diagram for indicating a first and a second display unit of a mobile terminal.

Referring to FIG. 2(a), the first display unit 110 can be situated at the front or back of the mobile terminal 100. And, as mentioned in FIG. 1, the first display unit may correspond to a display which mainly implements content or application by a user as a main display of the mobile terminal 100. Referring to FIG. 2(b), the second display unit 120 can be situated at the opposite side of the first display unit 110. For instance, the first display unit can be used for displaying an electric power-intensive video, color content, and the like and the second display unit can be used for displaying a text and the like, which consume less electric power.

FIG. 3 is a diagram for indicating a first and a second display unit in accordance with a state of a mobile terminal. A state of the mobile terminal 100 may include an active state and a standby state.

First of all, the active state may correspond to a state that a user input for the mobile terminal 100 is continued or a state that content or an application is executing in the mobile terminal 100. And, the active state indicates a state that the content executed in the mobile terminal 100 is usable in the display unit 110/120. For instance, the mobile terminal 100 may execute content, an application, and the like in the active state by a user input. Next, the standby state may correspond to a state that the power of the display unit 110/120 is off and the power is saved since the input to the mobile terminal 100 does not exist. And, the standby state may correspond to a state that a user input is not detected for a prescribed time. And, the standby state may include a state that the user input is not recognized even though the power of the display unit is not turned off. A case of switching from an active to a standby state may include a case that an input for a side button 160 situated at the side of the mobile terminal 100 is detected. In this case, the side button 160 may correspond to a physical key. And, the case of switching from the active to the standby state may include a case that a pre-set time (t) elapses.

Referring to FIG. 3(a), it indicates that the first display unit 110 of the mobile terminal 100 switches from an active to a standby state. A left diagram of FIG. 3(a) indicates the active state of the mobile terminal 100 and a home screen is displayed in the first display unit 110. Referring to FIG. 3(b), it indicates that the second display unit 120 of the mobile terminal 100 switches from an active to a standby state. A left diagram of FIG. 3(b) indicates the active state of the mobile terminal 100 and an image is displayed in the second display unit 120. In the active state, the mobile terminal 100 may detect a user input for a displayed icon and may be then able to execute a program or an application based on the detected user input.

In case that a user input for the mobile terminal 100 does not exist for a reference time (T), the mobile terminal 100 may detect a trigger signal to switch to a standby state. The mobile terminal 100 may be switched to the standby based on the detected trigger signal. For instance, as shown in the right diagram of FIG. 3(a), the mobile terminal 100 may turn off the power of the first display unit 110 in the standby state. And, for instance, as shown in the right diagram of FIG. 3(b), the mobile terminal 100 may be turned off the power of the second display unit 110 in the standby state. Yet, as mentioned in FIG. 1, since the second display unit 120 uses an e-paper display panel, a displayed image and the like do not disappear even though a power is not supplied. Hence, as shown in the right diagram of FIG. 3(b), the displayed image can be maintained even in case that the power is turned off.

In particular, in case that the mobile terminal 100 switches from an active state to a standby state, the image displayed in the first display unit 110 disappears but the image displayed in the second display unit can be maintained as it is. In this case, in order for a user to check an image or content to be displayed in the second display unit 120 in the standby state, it is necessary to rotate or move the mobile terminal 100. Hence, the present specification intends to provide a method of preview or selecting the content to be displayed in the second display unit 120 in the first display unit 110 before the mobile terminal switches from the active to the standby state. Regarding the method, it is described with reference to FIG. 4 to FIG. 12.

FIG. 4 is a diagram for indicating an embodiment of a standby state preview interface. More specifically, FIG. 4 indicates the standby state preview interface displayed in the first display unit 110 before the mobile terminal 100 switches from an active state to a standby state.

The standby state preview interface 130 indicates an interface provided to configure a content displayed in the second display unit 120 of the mobile terminal 100 in the standby state. For instance, the standby state preview interface 130 may display the content to be displayed in the second display unit 120 in the standby state irrespective of the existence of a user input. And, for instance, the standby state preview interface 130 may display the content displayed in the second display unit 120. The standby state preview interface 130 may display an image of a freeze frame of the content to be displayed in the second display unit 120 in the standby state. In this case, the freeze frame may include a representative screen of the content, a screen displayed at the end, and the like.

In one embodiment, referring to FIG. 4(a), the standby state preview interface 130-a may display the content 132 currently displayed in the second display unit 120. Hence, a user may check the content to be displayed in the second display unit 120 for a predetermined time immediately before the mobile terminal 100 switches to the standby state. In another embodiment, referring to FIG. 4(b), the standby state preview interface 130-b may display the content 132 currently displayed in the second display unit 120 and default content 133/134/135.

Also, in another embodiment, referring to FIG. 4(c), the standby state preview interface 130-c may display the content 131 currently displayed in the first display unit 110, the content 132 currently displayed in the second display unit 120, and default contents 133/134/135. In this case, the default content may correspond to the content to be displayed in the second display unit 120 of the mobile terminal 100 in the standby state. For instance, the default content may include a clock 133, a calendar 134, weather 135, and the like. And, in another embodiment, referring to FIG. 4(d), the standby state preview interface 130-d may display the contents F1/F2 currently executed in the first display unit 110, the contents R1/R2 currently executed in the second display unit 120, and the default contents 133/134/135. Besides this, the standby state preview interface 130 may display various contents according to the settings of a user.

Meanwhile, in case that the first display unit 110 is situated at the front side of the mobile terminal 100, the mobile terminal 100 may display the standby state preview interface 130 in the first display unit 110. This is because, if the second display unit 120 is situated at the front of the mobile terminal 100, the content displayed in the second display unit 120 can be checked immediately although the standby state preview interface 130 does not exist. And, the mobile terminal 100 may adjust the brightness of the first display unit 110 darker than reference brightness while displaying the standby state preview interface 130 in the first display unit 110. This is intended to make a user aware that the mobile terminal 100 is going to switch from the active to the standby state in a manner of darkening the brightness of the first display unit 110.

In the following description, FIG. 5 to FIG. 11 are embodiments indicating a switching from an active state to a standby state of the mobile terminal 100 based on the standby state preview interface 130 aforementioned in FIG. 4.

Figure 5:
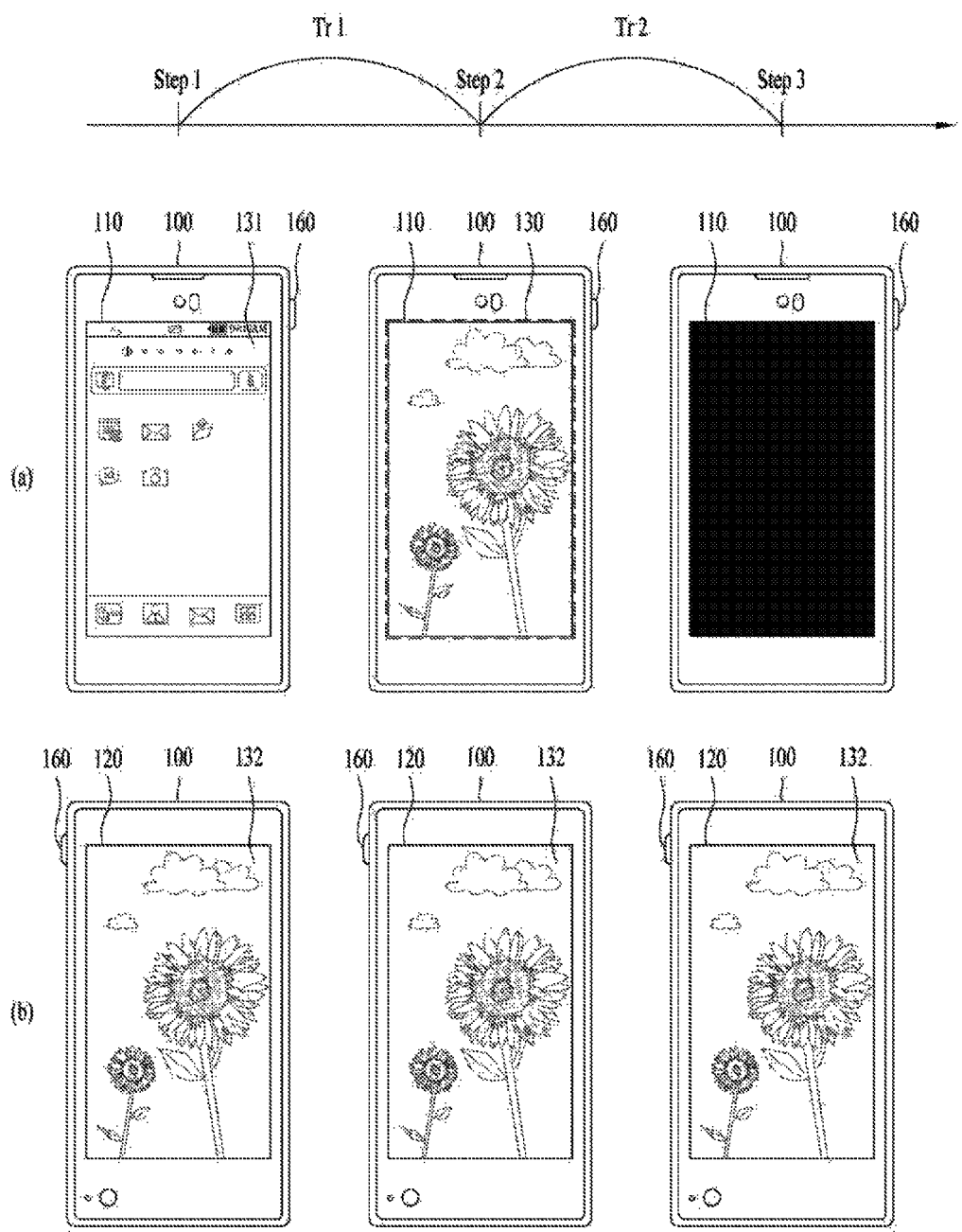
FIG. 5 is a diagram for indicating a first embodiment of a mobile terminal switching from an active state to a standby state.

FIG. 5 is a diagram for indicating a first embodiment of a mobile terminal switching from an active state to a standby state. More specifically, in case of an active state (step 1) and in case that a user input for the standby state preview interface 130 does not exist, FIG. 5 indicates a switching from the active state (step 1) to the standby state (step 3) of the mobile terminal. FIG. 5(a) indicates a change of the first display unit 110 and FIG. 5(b) indicates a change of the second display unit 120.

First of all, the mobile terminal 100 may detect a trigger signal to switch to a standby state in an active state (step 1). The trigger signal is a signal to induce a standby state preview interface 130 to be displayed in the first display unit 110 of the mobile terminal 100. The trigger signal may include a signal automatically occurring in case that an user input for the mobile terminal 100 does not exist and a user input signal.

In one embodiment, the trigger signal may indicate a signal automatically occurring in case that an user input for the mobile terminal 100 does not exist for a first reference time (Tr 1) in an active state (step 1). In this case, the first reference time (Tr 1) indicates a time taken for displaying the standby state preview interface (step 2) in the active state (step 1) in case that a user input for the mobile terminal 100 does not exist. And, the first reference time (Tr 1) may correspond to the time of a prescribed range out of a standby state switching time (Tr) necessary for the mobile terminal 100 to switch from the active state (step 1) to the standby state (step 3). For instance, in case that the standby state switching time (Tr) is 10 seconds, the first reference time (Tr 1) may correspond to 7 seconds. In this case, the trigger signal may occur in case that the input signal for the mobile terminal 100 does not exist for 7 seconds.

In another embodiment, the trigger signal may indicate an input signal detected within the first reference time (Tr 1) in the active state (step 1). In this case, the input signal may include a signal by the contact touch with a side button 160 situated at the side of the mobile terminal 100 or a home button or a signal by the proximity touch input. For instance, the side button 160 corresponds to a hardware key in FIG. 5.

Next, the mobile terminal 100 may display the standby state preview interface 130 in the first display unit 110 based on the detected trigger signal (step 2). And, as shown in FIG. 4(a), the standby state preview interface 130 may display the content 132 currently displayed in the second display unit 130. For instance, in case that the mobile terminal 100 detected an input signal to switch to a standby state, the mobile terminal may display the standby state preview interface 130 immediately after the input signal is detected. And, for instance, in case that the input signal for the mobile terminal 100 is not detected for the first reference time (Tr 1), the mobile terminal 100 may display the standby state preview interface 130 after the first reference time (Tr 1) elapsed. Referring to FIG. 5, it corresponds to a case that the input signal is not detected for the first reference time (Tr 1) in the active state (step 1), the mobile terminal 100 displays the standby state preview interface 130 in the first display unit 110.

Meanwhile, the standby state preview interface 130 can be displayed in the mobile terminal 100 for a second reference time (Tr 2). And, while the standby state preview interface 130 is displayed in the first display unit 110, the second display unit 120 may continuously display the content 132 currently displayed. Yet, for instance, in case that an input signal for the mobile terminal 100 is detected within the second reference time (Tr 2), the mobile terminal 100 can be switched to the standby state. And, for instance, in case that the input signal for the mobile terminal 100 is not detected within the second reference time (Tr 2), the mobile terminal 100 can be switched to the standby state after the second reference time (Tr 2) elapsed.

Next, in case that an input signal is not detected for the second reference time (Tr 2) for which the standby state preview interface 130 is displayed, the mobile terminal 100 may be switched to a standby state (step 3). In this case, the power of the first display unit 110 of the mobile terminal 100 is turned off and the displayed content disappears. The content displayed in the second display unit can be maintained as it is even though the power of the second display unit 120 is turned off. As mentioned in FIG. 3, since the second display unit 120 uses an e-paper display panel, a lately displayed content or an image can be maintained even though a power supply is suspended. Hence, referring to FIG. 5, the mobile terminal 100 may continuously display the content displayed in the second display unit 120 in the standby state without any change. More specifically, the mobile terminal 100 may continuously display an image of the content displayed in the second display unit 120. Meanwhile, for instance, in case that an input for the mobile terminal 100 is detected before the second reference time (Tr 2) elapses, the mobile terminal 100 may be switched to the standby state. In this case, the input for the mobile terminal 100 may include the input for the side button 160, the input for the standby state preview interface 130, and the like.

And, the mobile terminal 100 may display a different content as well as the content 132 currently displayed in the second display unit in the standby state preview interface 130. In this case, if an input for selecting the different content is not detected, the mobile terminal 100 can be configured to continuously display the content 132 currently displayed in the second display unit 120.

Meanwhile, in case that an input signal is not detected for the second reference time (Tr 2), the mobile terminal 100 may be turned off the power. More specifically, in case that the input signal for the mobile terminal 100 is detected within the second reference time (Tr 2), the mobile terminal 100 may turn off the power without switching to the standby state (step 3). In this case, the input signal may include the input signal for a physical key situated at the side of the mobile terminal 100, the input signal for a home button, and the input signal for the standby state preview interface 130 displayed in the first display unit 110.

According to the first embodiment, a user may easily check the content to be displayed in an e-paper display panel immediately before the mobile terminal 100 switches to the standby state without rotating or moving the mobile terminal 100.

Figure 6:
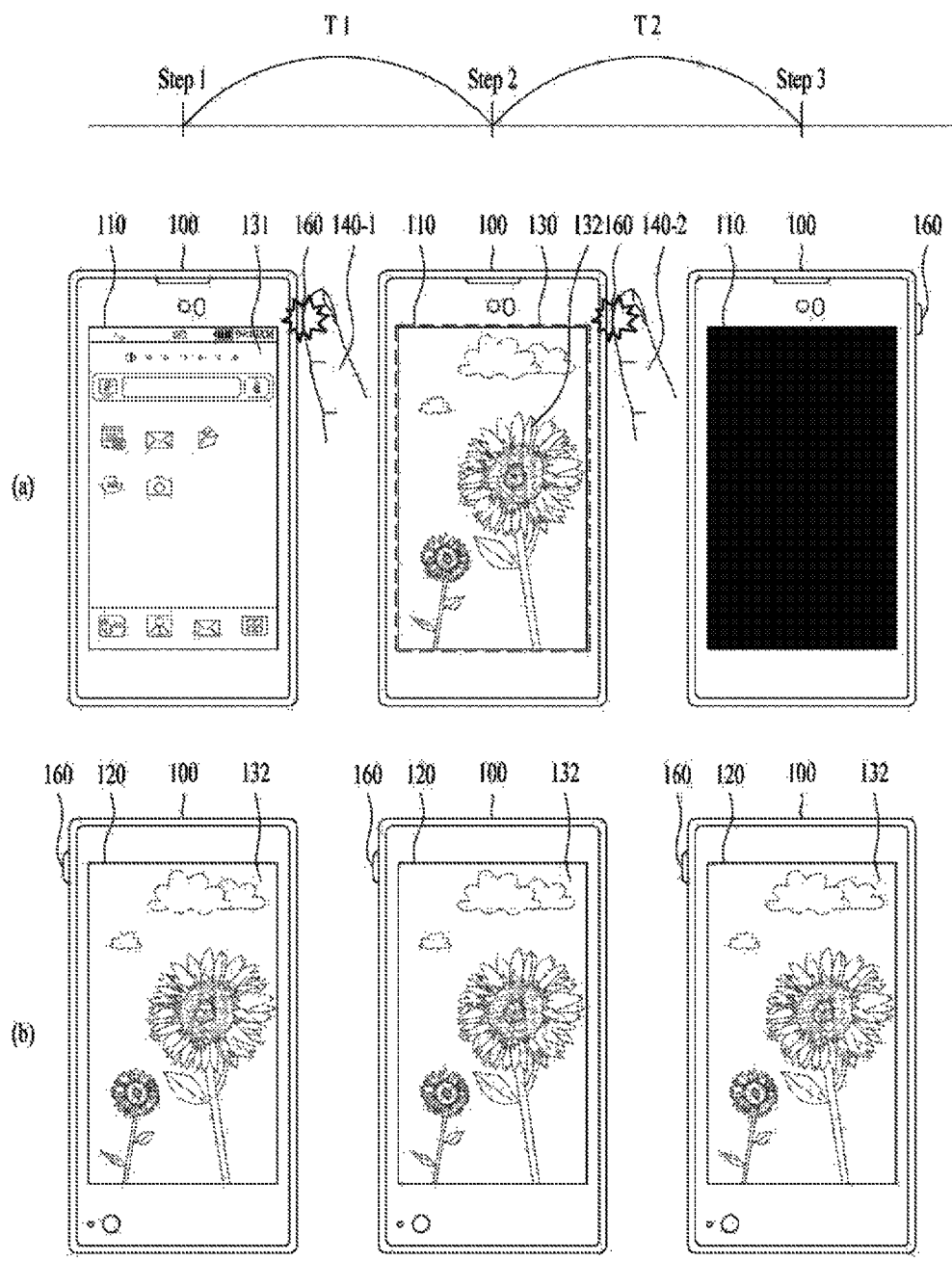
FIG. 6 is a diagram for indicating a second embodiment of a mobile terminal switching from an active state to a standby state.

FIG. 6 is a diagram for indicating a second embodiment of a mobile terminal switching from an active state to a standby state. More specifically, FIG. 6 indicates a switching of a mobile terminal 100 from an active state (step 1) to a standby state (step 3) in case of the active state and in case that a user input for a standby state preview interface 130 exists. FIG. 6(a) indicates a change of a first display unit 110 and FIG. 6(b) indicates a change of a second display unit 120.

First of all, the mobile terminal 100 may detect a trigger signal to switch to the standby state in an active state (step 1). In FIG. 6, the trigger signal includes a signal by a user input 140-1. In this case, the user input 140-1 may correspond to a physical input for the mobile terminal 100. For instance, the user input 140-1 may include a contact input for a side button 160 situated at the side of the mobile terminal 100 or the contact input for a home button (not depicted) of the mobile terminal 100. Next, the mobile terminal 100 may display a standby state preview interface 130 in the first display unit 110 based on the detected user input 140-1 (step 2). Referring to FIG. 6, the mobile terminal 100 may display the content 132 currently displayed in the second display unit 120 in the standby state preview interface 130. In this case, if the user input 140-1 is detected in the active state, the mobile terminal 100 may display the standby state preview interface 130 in the first display unit 110. For instance, a T1 may correspond to a shorter time in comparison with the first reference time (Tr 1) aforementioned in FIG. 5. In particular, in case that the user input 140-1 is detected within the first reference time (Tr 1), the mobile terminal 100 may display the standby state preview interface 130 even though the first reference time (Tr 1) does not elapse.

Next, the mobile terminal 100 may detect a user input 140-2 in a state (step 2) that the standby state preview interface 130 is displayed in the first display unit 110. In this case, the user input 140-2 may include the input for the standby state preview interface 130, the input for a side button 160 situated at the side of the mobile station 100, and the like. Referring to FIG. 6, the user input 140-2 may correspond to the input for the side button situated at the side of the mobile terminal 100.

Next, the mobile terminal 100 may be switched to a standby state (step 3) in response to the detected user input 140-2. In this case, the content 132 displayed in the second display unit 120 in the active state can be displayed in the second display unit 120 as it is in the standby state. And, if the user input 140-2 is detected (T2), the mobile terminal 100 may be switched to the standby state. For instance, the T2 may correspond to a shorter time in comparison with the second reference time (Tr 2) aforementioned in FIG. 5. In particular, in case that the user input 140-2 is detected within the second reference time (Tr 2), the mobile terminal 100 may be switched to the standby state even though the second reference time (Tr 2) does not elapse.

According to the second embodiment, a user may quickly check a content to be displayed in the second display unit and switch to the standby state based on the detected input signal even though a reference time, which is necessary for the mobile terminal to switch from the active state to the standby state, does not elapse.

Figure 7:
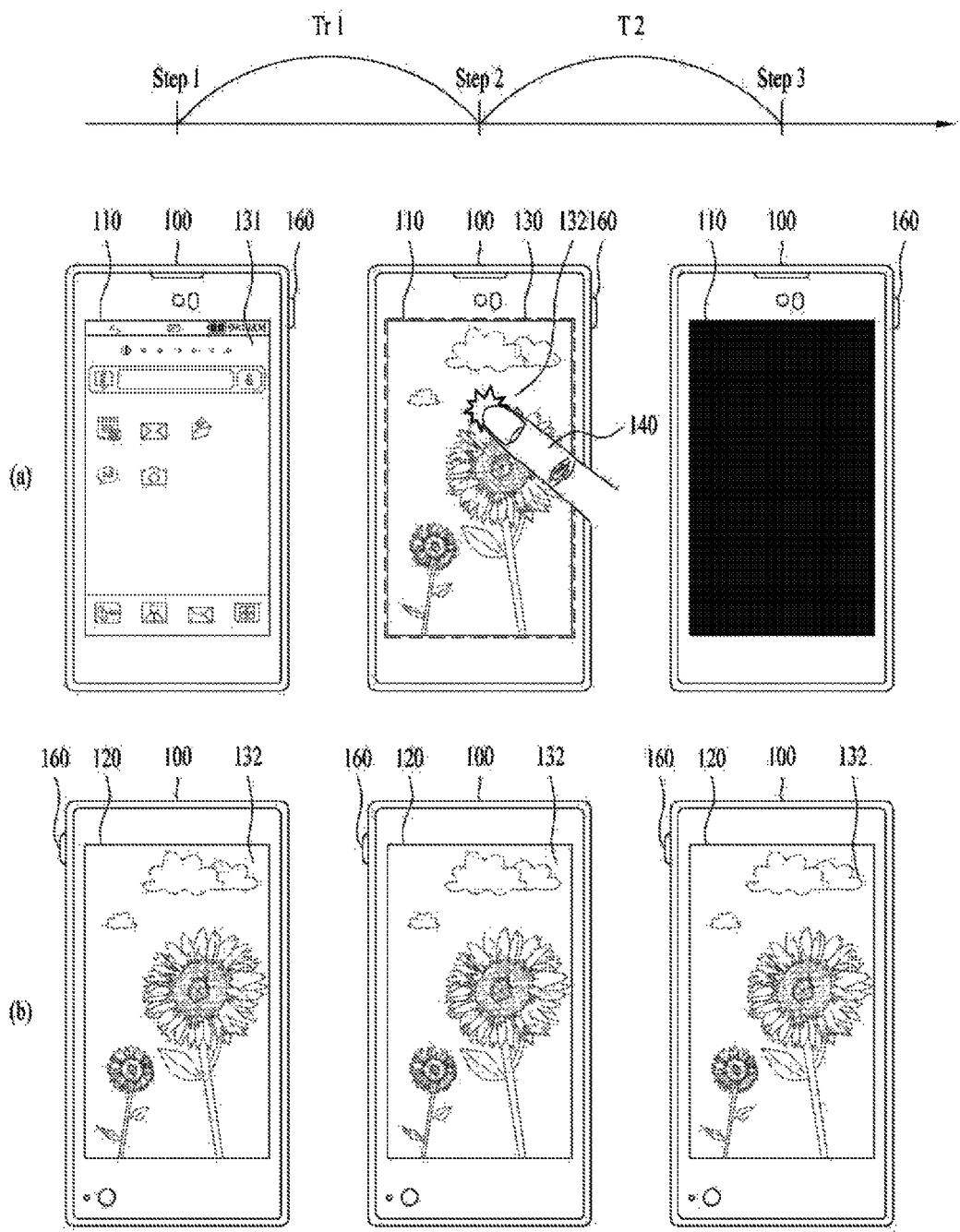
FIG. 7 is a diagram for indicating a third embodiment of a mobile terminal switching from an active state to a standby state.

FIG. 7 is a diagram for indicating a third embodiment of a mobile terminal switching from an active state to a standby state. More specifically, FIG. 7 indicates a switching from an active state to a standby state of the mobile terminal 100 in case that a user input does not exist in the active state and the user input for a standby state preview interface 130 exists. FIG. 7(a) indicates a change of a first display unit 110 and FIG. 7(b) indicates a change of a second display unit 120.

First of all, the mobile terminal 100 may detect a trigger signal to switch to the standby state in an active state (step 1). For instance, referring to FIG. 7, the trigger signal may correspond to a signal automatically occurring in case that an input signal for the mobile terminal 100 does not exist for a predetermined time (Tr 1). Next, the mobile terminal 100 may display a standby state preview interface 130 in the first display unit 110 based on the detected trigger signal (step 2). Referring to FIG. 7, the mobile terminal 100 may display the content 132 currently displayed in the second display unit 120 in the standby state preview interface 130.

Next, the mobile terminal 100 may detect a user input 140 for the standby state preview interface 130. In this case, the user input 140 may include a contact input for a button of the mobile terminal 100, the contact input for the standby state preview interface 130, and the like. Next, the mobile terminal 100 may be switched to a standby mode (step 3) based on the detected user input 140. In this case, if the user input 140 is detected, the mobile terminal 100 may be switched to the standby mode. For instance, a T2 time may correspond to a shorter time in comparison with the second reference time (Tr 2) aforementioned in FIG. 5. And, in the standby mode, the mobile terminal 100 may continuously display the content 132 currently displayed in the second display unit 120 without any change.

According to the 3$^{rd}$ embodiment, a user may check a content to be displayed in the second display unit in advance in the standby mode using a user input to the standby state preview interface, which is displayed if a reference time elapses.

Figure 8:
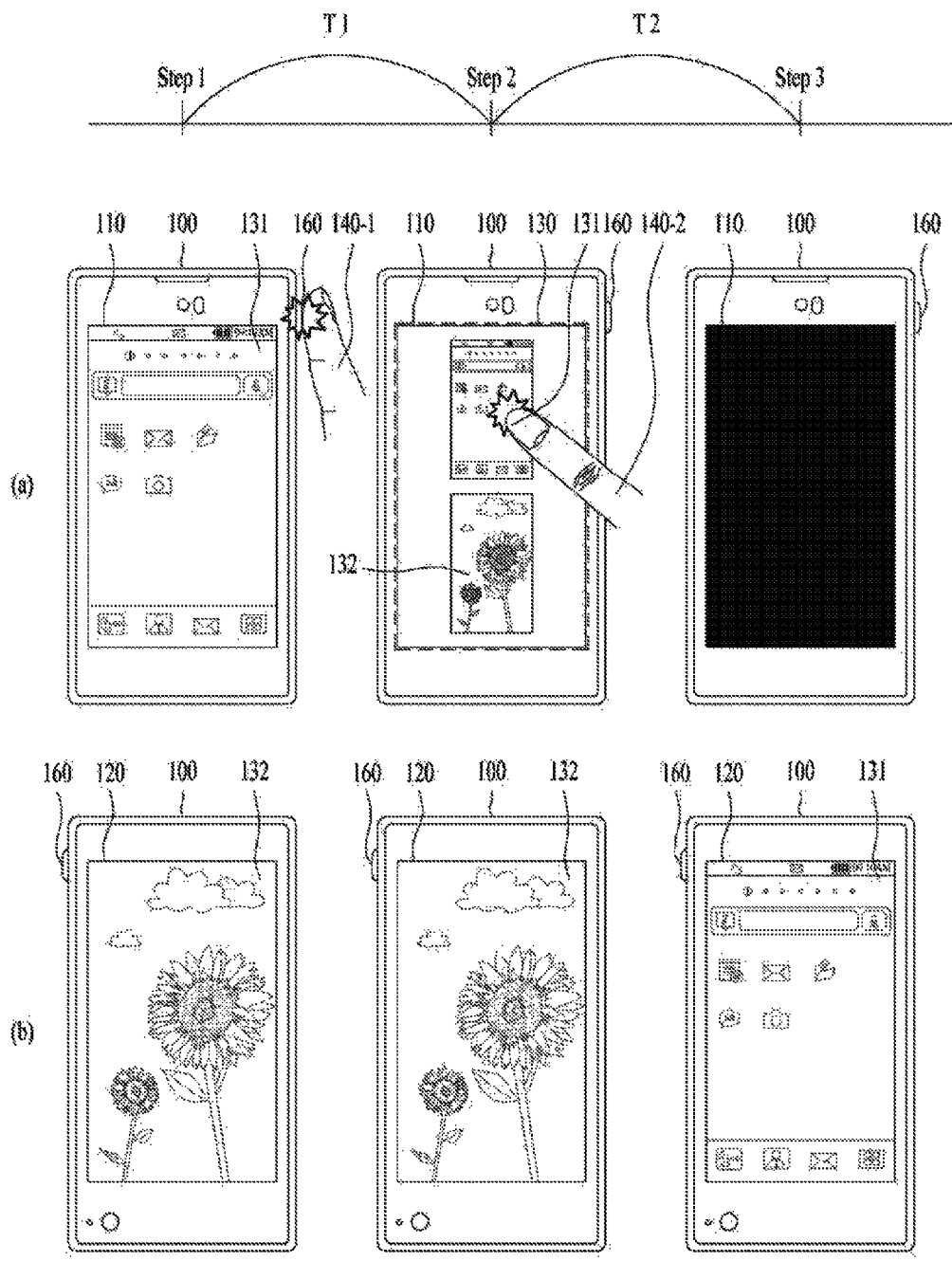
FIG. 8 is a diagram for indicating a fourth embodiment of a mobile terminal switching from an active state to a standby state.

FIG. 8 is a diagram for indicating a fourth embodiment of a mobile terminal switching from an active state to a standby state. More specifically, FIG. 8 indicates a switching from an active state (step 1) to a standby state (step 3) of the mobile terminal 100 in case of the active state (step 1) and in case that an user input for a standby state preview interface 130 exists. FIG. 8(a) indicates a change of a first display unit 110 and FIG. 8(b) indicates a change of a second display unit 120.

Figure 9:
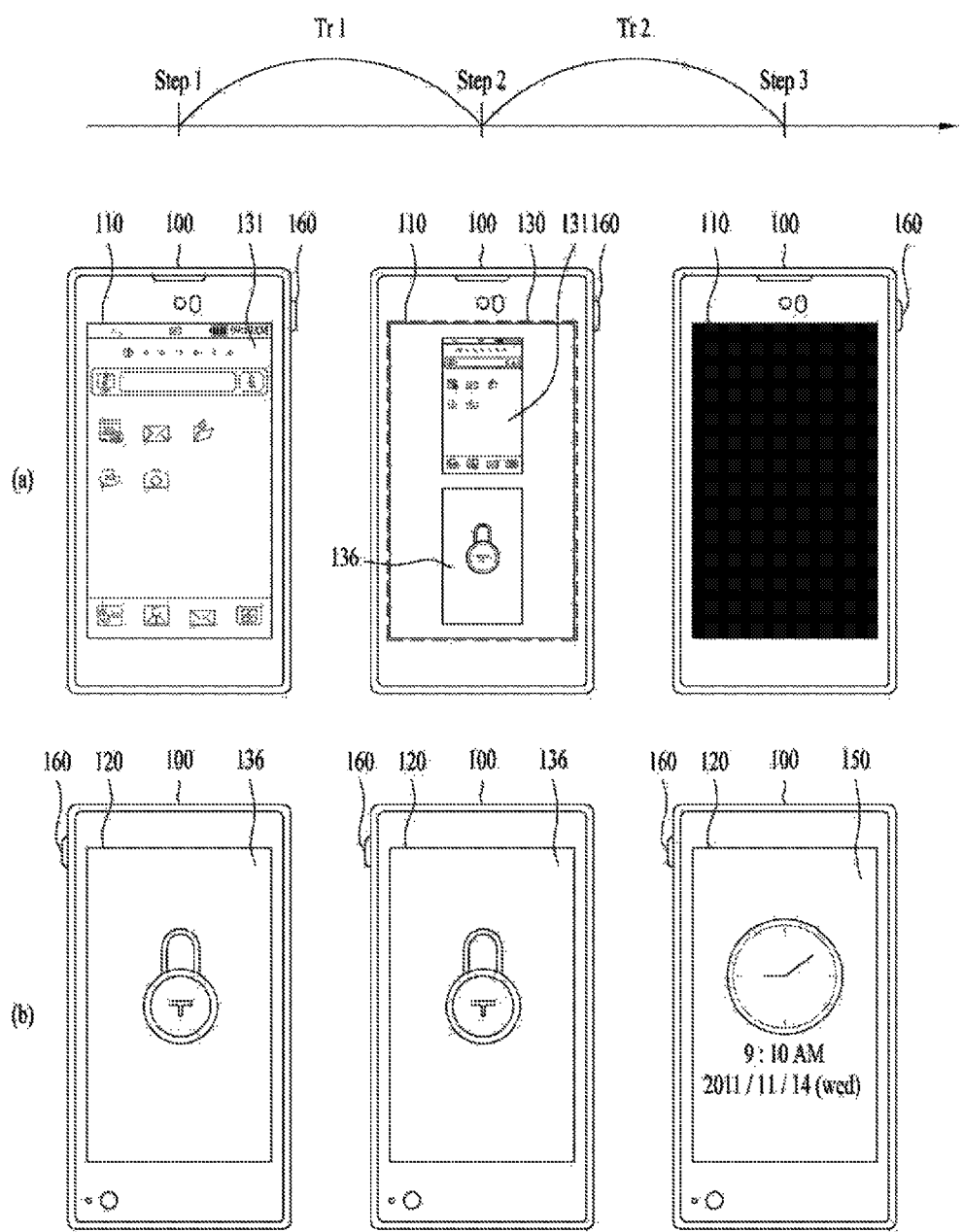
FIG. 9 is a diagram for indicating a fifth embodiment of a mobile terminal switching from an active state to a standby state.

First of all, the mobile terminal 100 may detect a trigger signal to switch to the standby state in the active state (step 1). Referring to FIG. 9, the trigger signal may include a contact signal for a side button 160 situated at the side of the mobile terminal 100. Next, the mobile terminal 100 may display the standby state preview interface 130 in the first display unit 110 based on the detected trigger signal (step 2). In this case, the mobile terminal 100 may display the content 131 currently displayed in the first display unit 110 and the content 132 currently displayed in the second display unit 120 in the standby state preview interface 130. More specifically, referring to FIG. 8, the standby state preview interface 130 may simultaneously display an image of the content 131 and the image of the content 132.

Next, if a user input 140-2 for the standby state preview interface 130 is detected (T2), the mobile terminal 100 may switch to the standby state. For instance, the T2 may correspond to a shorter time in comparison with the second reference time (Tr 2) aforementioned in FIG. 5. At the same time, if the user input 140-2 for the standby state preview interface 130 is detected, the mobile terminal 100 may modify the content displayed in the second display unit 120 based on the detected user input 140-2. Referring to FIG. 8, the mobile terminal 100 may display the content 132 displayed in the second display unit 120 in a manner of changing into the content 131 displayed in the first display unit 110 in the standby state in response to the user input 140-2 for selecting an image of the content 131 displayed in the first display unit 110 in the active state. In this case, the mobile terminal 100 may turn on a backlight of the second display unit 120 for a predetermined time in the standby state (step 3). For instance, the predetermined time may include 2 seconds. This is intended to make a user aware that the content displayed in the second display unit 120 is changed and make the user recognize easily.

According to the 4$^{th}$ embodiment, a user may display a content that the user wants in a manner of setting up the content among a plurality of contents displayed in the standby state preview interface 130 in the second display unit 120 in the standby state.

FIG. 9 is a diagram for indicating a fifth embodiment of a mobile terminal switching from an active state to a standby state. More specifically, in case of the active state and in case that a user input for a standby state preview interface 130 does not exist, FIG. 9 indicates a switching from the active state (step 1) to the standby state (step 3) of the mobile terminal displaying security content 136. In this case, the security content 136 may indicates the content capable of being worried about an invasion of privacy of a user if the content is open to others. For instance, the security content 136 may include a bank security card, a personal schedule, a diary, a task-related content, and the like. FIG. 9(a) indicates a change of a first display unit 110 and FIG. 9(b) indicates a change of a second display unit 120.

First of all, the mobile terminal 100 may detect a trigger signal to switch to the standby state in the active state (step 1). Referring to FIG. 9, the trigger signal may correspond to a signal automatically occurring in case that an input signal for the mobile terminal 100 is not detected for a first reference time (Tr 1). Next, the mobile terminal 100 may display a standby state preview interface 130 in the first display unit 110 based on the detected trigger signal (step 2). Referring to FIG. 9, the mobile terminal 100 may display the content 131 currently displayed in the first display unit 120 and the security content 136 currently displayed in the second display unit 120 in the standby state preview interface 130. In this case, an image of the security content 136 displayed in the standby state preview interface 130 may correspond to the image of the security content 136 currently displayed in the second display unit 120. And, the image of the security content 136 displayed in the standby state preview interface 130 may correspond an icon (not depicted) image capable of indicating that the image represents the security content 136.

Next, in case that an input signal is not detected for a second reference time (Tr 2) for which the standby state preview interface 130 is displayed, the mobile terminal 100 may be switched to the standby state (step 3). In this case, default content can be displayed in the second display unit 120 instead of the security content 136 currently displayed. In this case, the default content corresponds to the content having no invasion of privacy of a user when the content is displayed to the others instead of the security content 136. For instance, the default content may include the contents of a clock, a calendar, weather, and the like. Referring to FIG. 9, the mobile terminal 100 may be able to display clock content 150 as the default content.

Meanwhile, as a different embodiment, the mobile terminal 100 may determine that the content displayed in the second display unit 120 is a security content. In this case, if a trigger signal is detected, the mobile terminal 100 may not display the standby state preview interface 130 in the first display unit 110. At the same time, if a trigger signal is detected, the mobile terminal 100 displays the security content in the second display unit 120 and may be then switched to the standby state.

According to the 5$^{th}$ embodiment, although the mobile terminal 100 displaying security content automatically switches to the standby state without a user input, the security content displayed in the second display unit 120 automatically switches to default content, thereby reducing an invasion of privacy of a user.

Figure 10:
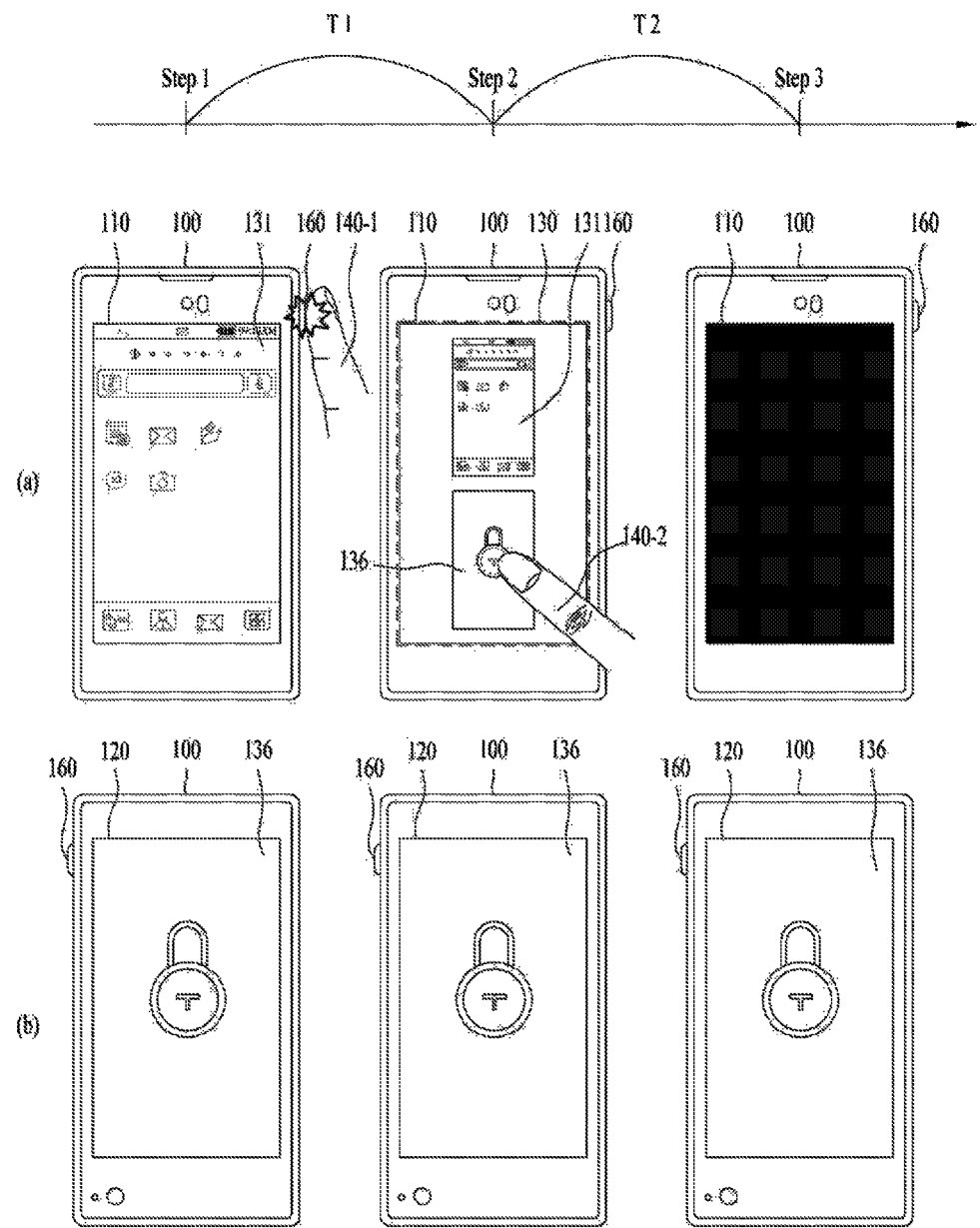
FIG. 10 is a diagram for indicating a sixth embodiment of a mobile terminal switching from an active state to a standby state.

FIG. 10 is a diagram for indicating a sixth embodiment of a mobile terminal switching from an active state to a standby state. More specifically, in case of an active state (step 1) and in case that a user input for a standby state preview interface 130 exists, FIG. 10 indicates a switching from the active state (step 1) to the standby state (step 3) of the mobile terminal 100 displaying a security content 136. FIG. 10(*a*) indicates a change of a first display unit 110 and FIG. 10(*b*) indicates a change of a second display unit 120.

Figure 11:
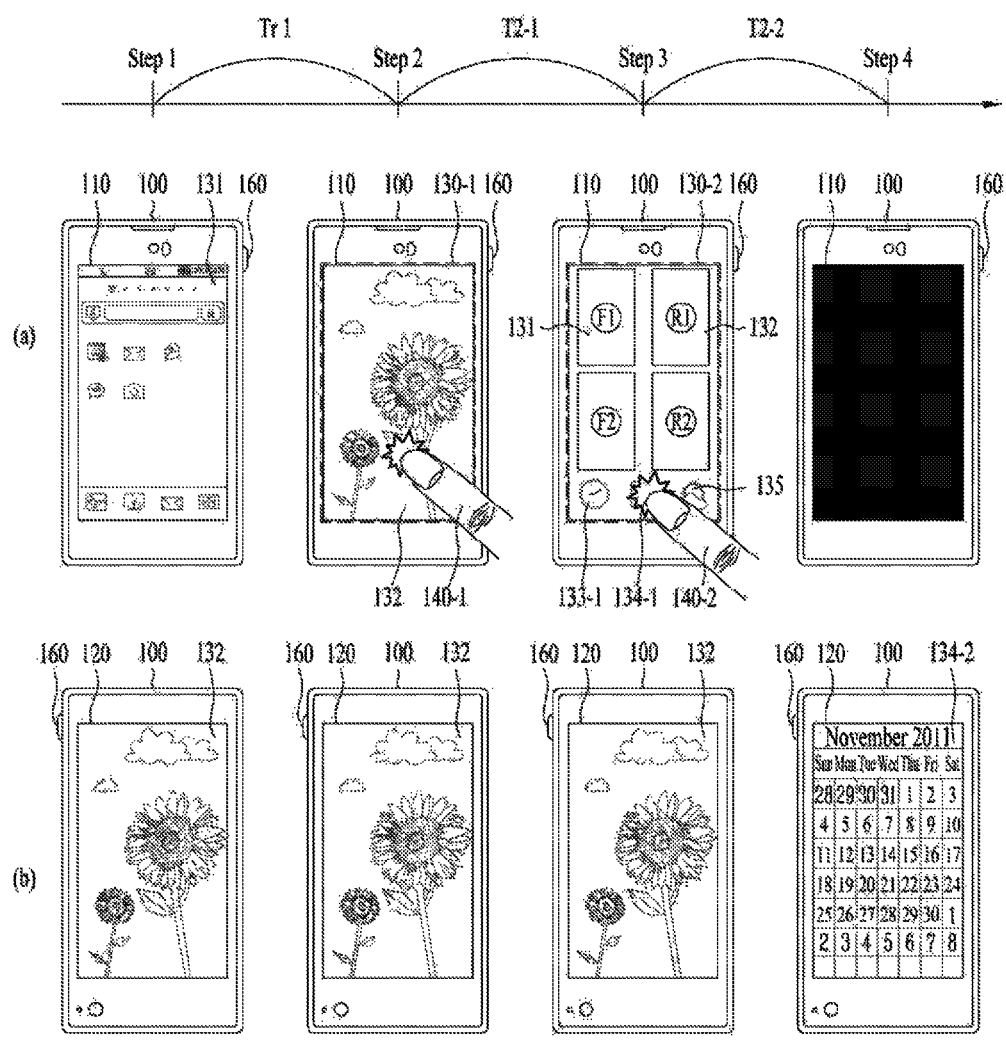
FIG. 11 is a diagram for indicating a seventh embodiment of a mobile terminal switching from an active state to a standby state.

First of all, the mobile terminal 100 may detect a trigger signal to switch to the standby state in the active state (step 1). Referring to FIG. 11, the trigger signal corresponds to a signal by a user input 140-1 for a side button 160 situated at the side of the mobile terminal 100. Next, the mobile terminal may display a standby state preview interface 130 in the first display unit 110 based on the detected trigger signal. In this case, if the trigger signal is detected (T1), the mobile terminal 100 may display the standby state preview interface 130 in the first display unit 110. For instance, a time t1 may correspond to a shorter time in comparison with the aforementioned first reference time (Tr 1). In particular, in case that a signal to switch to the standby state is detected within the first reference time (Tr 1), the mobile terminal 100 may display the standby state preview interface 130 in the active state. For instance, the standby state preview interface 130 may display the content 131 currently displayed in the first display unit 110 and the security content 136 currently displayed in the second display unit 120.

Next, in case that a user input 140-2 for the standby state preview interface 130 is detected (T2), the mobile terminal 100 may be switched to the standby state (step 3). For instance, the T2 may correspond to a shorter time in comparison with the second reference time (Tr 2) aforementioned in FIG. 5. And, referring to FIG. 10, the user input 140-2 for the standby state preview interface 130 may correspond to an input for a security content 136 displayed in the standby state preview interface 130. And, the mobile terminal 100 may continuously display the security content 136 in the second display unit 120 in the standby state based on the user input 140-2 for the security content 136.

According to the 6$^{th}$ embodiment, although the content displayed in the second display unit 120 corresponds to the content capable of being worried about an invasion of privacy, a user may be able to display the security content 136 in the second display unit 120 in the standby state in a manner of selecting.

Figure 12:
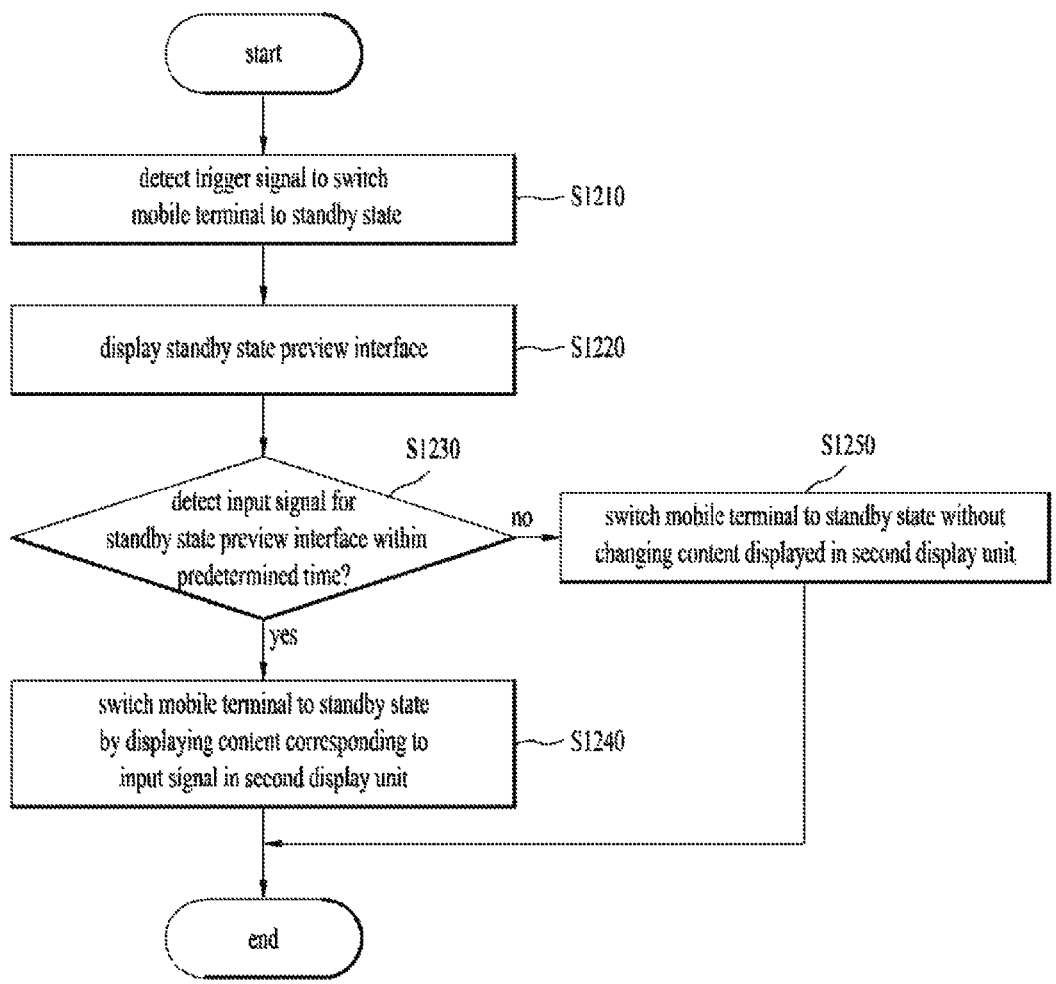
FIG. 12 is a flowchart for indicating a method of controlling a mobile terminal including a double-sided display unit.

FIG. 11 is a diagram for indicating a seventh embodiment of a mobile terminal switching from an active state to a standby state. More specifically, FIG. 11 indicates a switching from an active state (step 1) to a standby state (step 4) of the mobile terminal 100 providing a standby state preview interface 130 of two phases. FIG. 12(*a*) indicates a change of a first display unit 110 and FIG. 11(*b*) indicates a change of a second display unit 120.

First of all, the mobile terminal 100 may detect a trigger signal to switch to the standby state in the active state (step 1). Referring to FIG. 11, the trigger signal indicates a signal automatically occurring in case that an input signal for the mobile terminal 100 does not exist for a first reference time (Tr 1). Meanwhile, although it is not depicted in FIG. 11, the trigger signal includes the trigger signal detected within the first reference time (Tr 1) as well. Next, the mobile terminal 100 may display a first standby state preview interface 130-1 in the first display unit 110 based on the detected trigger signal (step 2). In this case, the first standby state preview interface 130-1 may display the content 132 currently displayed in the second display unit 120. Since the standby state preview interface 130 is provided to check a screen displayed in the second display unit 120.

Next, the mobile terminal may be able to detect an input signal 140-1 for the first standby state preview interface 130-1. In this case, the input signal may include a proximity touch for the first standby state preview interface 130-1, a contact touch, and the like. And, referring to FIG. 11, the input signal for the first standby state preview interface 130-1 may correspond to a signal intended to select a different content instead of the content currently displayed in the second display unit 120. Meanwhile, in case that the input signal for the first standby state preview interface 130-1 is not detected for a second reference time (Tr 2), the mobile terminal 100 may be switched to the standby state.

Next, the mobile terminal 100 may display a second standby state preview interface 130-2 in the first display unit 110 based on the detected input signal (step 3). The second standby state preview interface 130-2 may display the content 131 displayed in the first display unit 110, the content F2 simultaneously executed with the content 131 in the first display unit 110, the content R2 simultaneously executed with the content 132 in the second display unit 120, default content 133/134/135 and the like as well as the content 132 currently displayed in the second display unit 120, which is displayed in the first standby state preview interface 130-1. This is intended to make a range of choice of a user for the content to be displayed in the second display unit 120 broaden in the standby state. And, the mobile terminal 100 detects the input signal 140-1 for the first standby state preview interface 130-1 and may then display the second standby state preview interface 130-2 after a T2-1 time elapsed. The T2-1 time may correspond to a shorter time in comparison with the aforementioned second reference time (Tr 2).

Next, in case that the input signal 140-2 for the second standby state preview interface 130-2 is detected, the mobile terminal 100 may be switched to the standby state (step 4). Referring to FIG. 11, the input signal 140-2 corresponds to an input signal for a calendar 134-1 among the default contents. And, the mobile terminal 100 may display a calendar content 134-2 in the second display unit 120 based on the detected input signal 140-2. In this case, a T2-2 time may correspond to a shorter time in comparison with the aforementioned second reference time (Tr 2).

According to the 7$^{th}$ embodiment, a user may be able to variously select the content to be displayed in the second display unit 120 using the first and the second standby state preview interface in the standby state.

FIG. 12 is a flowchart for indicating a method of controlling a mobile terminal including a double-sided display unit. Each of the steps in FIG. 12, which shall be explained in the following description, can be controlled by the processor 140 of the mobile terminal 100 shown in FIG. 1.

First of all, a mobile terminal may detect a trigger signal to switch to a standby state [S1210]. As mentioned in FIG. 5, the trigger signal may include a signal automatically occurring in case that a user input for the mobile terminal does not exist and the signal by the user input. And, the signal by the user input may include the user input for a side button situated at the side of the mobile terminal and the user input for a home button situated at a first display unit.

Next, the mobile terminal may display a standby state preview interface in the first display unit based on the detected trigger signal [S1220]. In this case, as shown in FIG. 4, the standby state preview interface may display the content currently displayed in a second display unit. And, the standby state preview interface may display the content currently displayed in the first display unit, the content currently executed in the first and the second display unit, default content, and the like.

Next, the mobile terminal may determine whether the input signal for the standby state preview interface is detected within a predetermined time [S1230]. As mentioned in FIG. 7, the input signal for the standby state preview interface may include the input signal by a contact touch, a proximity touch, and the like. In case that an input signal is detected within the predetermined time in the step S1230, the mobile terminal displays the content corresponding to the input signal and may be switched the mobile terminal to a standby state [S1240]. As mentioned in FIG. 8, in case that the input signal for the content currently displayed in the first display unit is detected, the mobile terminal displays the content displayed in the first display unit in the second display unit in the standby state and may be then switched to the standby state.

Meanwhile, in case that the input signal is not detected within the predetermined time in the step S1230, the mobile terminal may be switched to the standby state without any change of the content displayed in the second display unit [S1250]. In particular, the mobile terminal may maintain the content displayed in the second display unit in the active state as it is in the standby state.

FIG. 13 is a flowchart for indicating a method of controlling a mobile terminal including a double-sided display unit. Each of the steps in FIG. 13, which shall be explained in the following description, can be controlled by the processor 140 of a digital device 100 shown in FIG. 1. And, in the embodiment of FIG. 13, detailed explanation on the part identical or corresponding to the embodiment of FIG. 10 is omitted.

First of all, the mobile terminal may detect a trigger signal to switch to a standby state [S1310]. Next, the mobile terminal may be able to display a standby state preview interface in a first display unit based on the detected trigger signal [S1320]. In this case, as shown in FIG. 9, the standby state preview interface may include the content currently displayed in the first display unit and the content currently displayed in the second display unit. And, the content displayed in the second display unit is a predetermined content and may include security content.

Next, the mobile terminal may determined whether an input signal for the standby state preview interface is detected within a predetermined time [S1330]. In case that the input signal is detected within the predetermined time in the step S1330, the mobile terminal may determine whether the input signal is corresponding to an input signal for a predetermined content [S1340]. In this case, the input signal for the predetermined content may include an input signal for the security content displayed in the standby state preview interface. In case that the input signal is corresponding to the input signal for the predetermined content in the step S1340, the mobile terminal displays the predetermined content in the second display unit and may be switched to the standby state [S1350]. In particular, if the signal is the input signal for the predetermined content, the mobile terminal may be switched the mobile terminal to the standby state without any change of the predetermined content displayed in the second display unit.

Meanwhile, in case that the input signal is not detected within the predetermined time in the step S1330, the mobile terminal displays default content in the second display unit and may be switched to the standby state [S1360]. As mentioned in FIG. 9, the default content corresponds to the content having no invasion of privacy of a user although the content is displayed to the others instead of the security content. For instance, the default content may include such content as a clock, a calendar, weather and the like. Meanwhile, in case that the input signal is not corresponding to the input signal for the predetermined content in the step S1340, the mobile terminal displays the content corresponding to the input signal in the second display unit and may be switched to the standby state [S1370].

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A mobile terminal including a double-sided display unit and a controlling method according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a mobile terminal including a double-sided display unit and a controlling method according to the present specification can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, to implement in a form of a carrier wave such as a transmission via an internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on the both of the inventions can be complementally applied, if necessary.

FIG. 1 first display unit 110, second display unit 120, sensor unit 130, processor 140, communication unit 150, storage unit 160, power unit 170

FIG. 12 start detect trigger signal to switch mobile terminal to standby state S1210 display standby state preview interface S1220 detect input signal for standby state preview interface within predetermined time ? S1230 switch mobile terminal to standby state by displaying content corresponding to input signal in second display unit S1240 switch mobile terminal to standby state without changing content displayed in second display unit S1250 end

FIG. 13 start detect trigger signal to switch mobile terminal to standby state S1310 display standby state preview interface S1320 detect input signal for standby state preview interface within predetermined time ? S1330 input signal for predetermined content ? S1340 switch mobile terminal to standby state by displaying predetermined content in second display unit S1350 switch mobile terminal to standby state by displaying display default content in second display unit S1360 switch mobile terminal to standby state by displaying content corresponding to input signal in second display unit S1370 end

What is claimed is:

1. A mobile terminal containing a double-sided display unit, comprising:
a first display unit and a second display unit, wherein the second display unit uses an e-paper display panel;
a sensor unit configured to detect an input signal and transmit the detected input signal to a processor; and
a processor configured to control the first display unit, the second display unit, and the sensor unit,
wherein the processor is further configured to:
detect a trigger signal to switch the mobile terminal to a standby state,
display a standby state preview interface in the first display unit displaying a content currently displayed in the second display unit based on the detected trigger signal, and
if an input signal from the sensor unit for the standby state preview interface is not detected within a predetermined time, switch the mobile terminal to the standby state without changing the content displayed in the second display unit,
wherein the standby state preview interface comprises at least one of a first image indicating the content currently displayed in the second display unit and a second image indicating the content displayed in the second display unit in the standby state according to the input signal, and
wherein the second image comprises at least one of a content currently displayed in the first display unit, the content currently displayed in the second display unit, and a default content set to the mobile terminal.

2. The mobile terminal of claim 1, wherein the processor is configured to switch the mobile terminal to the standby state without changing the first image displayed in the second display unit, if the input signal for the standby state preview interface is not detected within the predetermined time, and
switch the mobile terminal to the standby state by changing the first image displayed in the second display unit to the second image, if the input signal for the standby state preview interface is detected within the predetermined time.

3. The mobile terminal of claim 1, wherein the processor is configured not to display the standby state preview interface in the first display unit and switch the mobile terminal to the standby state, if the content currently displayed in the second display unit corresponds to a predetermined content.

4. The mobile terminal of claim 1, wherein the processor is configured to switch the mobile terminal to the standby state by changing the first image displayed in the second display unit to a default image, if the content currently displayed in the second display unit corresponds to a predetermined content and the input signal for the standby state preview interface is not detected within the predetermined time.

5. The mobile terminal of claim 4, wherein the processor is configured to display an icon indicating the first image in the standby state preview interface, if the content currently displayed in the second display unit corresponds to the predetermined content.

6. The mobile terminal of claim 1 wherein the processor is configured to display a first standby state preview interface displaying the first image in the first display unit based on the detected trigger signal, and
display a second standby state preview interface displaying the second image in the display unit based on the input signal for the first standby state preview interface.

7. The mobile terminal of claim 6, wherein the processor is configured to switch the mobile terminal to the standby state by changing the first image displayed in the second display unit to the second image, if the input signal for the second standby state preview interface is detected within the predetermined time.

8. The mobile terminal of claim 6, wherein the processor is configured to switch the mobile terminal to the standby state without changing the content displayed in the second display unit, if the input signal for the first standby state preview interface is not detected within the predetermined time.

9. The mobile terminal of claim 1, wherein the trigger signal comprises a user input signal and an automatically occurring signal when a user input for the mobile terminal does not exist.

10. The mobile terminal of claim 1, wherein the processor is configured to turn off power of the mobile terminal, if the input signal for the standby state preview interface is detected within the predetermined time.

11. The mobile terminal of claim 1, wherein the processor is configured to display the standby state preview interface, if the first display unit is situated at the front side of the mobile terminal.

12. The mobile terminal of claim 1, wherein the processor is configured to adjust a brightness of the first display unit to be darker for the predetermined time for providing the standby state preview interface.

13. The mobile terminal of claim 1, wherein the processor is configured to turn on a backlight of the second display unit for the predetermined time, if the mobile terminal switches to the standby state.

14. A method of controlling a mobile terminal containing a first display unit and a second display unit, wherein the second display unit uses an e-paper display panel, the method:
detecting, via a processor of the mobile terminal, a trigger signal to switch the mobile terminal to a standby state;
displaying a standby state preview interface in the first display unit displaying a content currently displayed in the second display unit based on the detected trigger signal; and
if an input signal from a sensor unit of the mobile terminal for the standby state preview interface is not detected within a predetermined time, switching, via the processor, the mobile terminal to the standby state without changing the content displayed in the second display unit,
wherein the standby state preview interface comprises at least one of a first image indicating the content currently displayed in the second display unit and a second image indicating the content displayed in the second display unit in the standby state according to the input signal, and wherein the second image comprises at least one of a content currently displayed in the first display unit, the content currently displayed in the second display unit, and a default content set to the mobile terminal.

15. The method of claim 14, wherein the switching to the standby state comprises:

switching the mobile terminal to the standby state without changing the first image displayed in the second display unit, if the input signal for the standby state preview interface is not detected within the predetermined time; and switching the mobile terminal to the standby state by changing the first image displayed in the second display unit into the second image, if the input signal for the standby state preview interface is detected within the predetermined time.

16. The method of claim 14, wherein the switching to the standby state comprises switching the mobile terminal to the standby state by changing the first image displayed in the second display unit into a default image, if the first image contains an image indicating a predetermined content and the input signal for the standby state preview interface is not detected within the predetermined time.

* * * * *